US011861898B2

(12) United States Patent
Prevrhal et al.

(10) Patent No.: US 11,861,898 B2
(45) Date of Patent: Jan. 2, 2024

(54) SELF-EXPANDING AUGMENTED REALITY-BASED SERVICE INSTRUCTIONS LIBRARY

(71) Applicant: KONINKLIJKE PHILIPS N.V., Eindhoven (NL)

(72) Inventors: Sven Peter Prevrhal, Hamburg (DE); Jörg Sabczynski, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/757,921

(22) PCT Filed: Oct. 18, 2018

(86) PCT No.: PCT/EP2018/078635
§ 371 (c)(1),
(2) Date: Apr. 21, 2020

(87) PCT Pub. No.: WO2019/081350
PCT Pub. Date: May 2, 2019

(65) Prior Publication Data
US 2020/0342228 A1 Oct. 29, 2020

Related U.S. Application Data

(60) Provisional application No. 62/575,553, filed on Oct. 23, 2017.

(51) Int. Cl.
*G06V 20/20* (2022.01)
*G06F 30/10* (2020.01)
(Continued)

(52) U.S. Cl.
CPC .............. *G06V 20/20* (2022.01); *G06F 30/10* (2020.01); *G06V 20/40* (2022.01); *G06F 2111/18* (2020.01)

(58) Field of Classification Search
CPC ............ G06K 9/00671; G06K 9/00711; G06F 30/10; G06F 2111/18; G06F 3/011; G02B 27/017
See application file for complete search history.

(56) References Cited

U.S. PATENT DOCUMENTS 8,489,408 B2 * 7/2013 Sawanaga .............. G16H 40/40
705/2
8,914,472 B1 * 12/2014 Lee ........................ G06Q 30/04
709/219

(Continued)

FOREIGN PATENT DOCUMENTS

EP 2560145 2/2013
EP 2876484 A1 * 5/2015 ......... G06K 9/00671
(Continued)

OTHER PUBLICATIONS

Masoni et al., Supporting remote maintenance in industry 4.0 through augmented reality, pp. 1-7, Jun. 2017 (Year: 2017).*

(Continued)

*Primary Examiner* — Motilewa Good-Johnson

(57) ABSTRACT

Augmented reality (AR) servicing guidance uses a mobile device (30, 90) with a display and a camera. Computer vision (CV) processing (102) such as Simultaneous Location and Mapping (SLAM) is performed to align AR content (80) with a live video feed (96) captured by the camera. The aligned AR content is displayed on the display of the mobile device. In one example, the mobile device is a head-up display (HUD) (90) with a transparent display (92, 94) and camera (20). In another example the mobile device is a cellphone or tablet computer (30) with a front display (34) and a rear-facing camera (36). The AR content (80) is generated by CV processing (54) to align (70) AR content with recorded video (40) of a service call. The aligning (72)

(Continued)

includes aligning locations of interest (LOIs) identified in the recorded video of the service call by a user input.

10 Claims, 3 Drawing Sheets

(51) Int. Cl.
*G06V 20/40* (2022.01)
*G06F 111/18* (2020.01)

(56) References Cited

U.S. PATENT DOCUMENTS

| | | | |
|---|---|---|---|
| 9,892,564 B1* | 2/2018 | Cvetko | G06T 15/04 |
| 10,025,887 B1* | 7/2018 | Santarone | G01S 5/0257 |
| 10,127,290 B1* | 11/2018 | Armstrong | H04N 21/4318 |
| 10,249,095 B2* | 4/2019 | Energin | G06F 3/012 |
| 10,548,667 B2* | 2/2020 | Flett | A61B 90/361 |
| 10,951,872 B2* | 3/2021 | Casas | H04N 13/279 |
| 11,032,603 B2* | 6/2021 | Mullins | G06T 19/006 |
| 2002/0069072 A1* | 6/2002 | Friedrich | G05B 19/41875 |
| | | | 704/275 |
| 2006/0241792 A1 | 10/2006 | Pretlove | |
| 2009/0213034 A1* | 8/2009 | Wu | G16H 30/20 |
| | | | 715/788 |
| 2010/0159434 A1* | 6/2010 | Lampotang | G09B 23/28 |
| | | | 434/365 |
| 2010/0257252 A1* | 10/2010 | Dougherty | G06V 10/95 |
| | | | 709/217 |
| 2011/0164163 A1* | 7/2011 | Bilbrey | H04N 5/23206 |
| | | | 348/E5.022 |
| 2011/0316845 A1* | 12/2011 | Roberts | G06T 19/006 |
| | | | 345/419 |
| 2012/0116728 A1* | 5/2012 | Shear | G06F 30/00 |
| | | | 703/1 |
| 2012/0166462 A1* | 6/2012 | Pathak | G06F 3/04845 |
| | | | 707/758 |
| 2013/0010068 A1* | 1/2013 | Tiernan | G06V 30/142 |
| | | | 348/46 |
| 2013/0114100 A1* | 5/2013 | Torii | H04N 1/00037 |
| | | | 358/1.14 |
| 2014/0125700 A1* | 5/2014 | Ramachandran | G09G 5/377 |
| | | | 345/633 |
| 2014/0320529 A1 | 10/2014 | Roberts | |
| 2014/0321702 A1* | 10/2014 | Schmalstieg | G06T 19/006 |
| | | | 382/103 |
| 2014/0327792 A1* | 11/2014 | Mulloni | H04N 5/23203 |
| | | | 348/211.8 |
| 2015/0040074 A1 | 2/2015 | Hofmann | |
| 2015/0125045 A1* | 5/2015 | Gauglitz | G06T 7/246 |
| | | | 382/107 |
| 2015/0219767 A1* | 8/2015 | Humphreys | G01S 19/54 |
| | | | 342/357.26 |
| 2015/0262412 A1* | 9/2015 | Gruber | G06T 15/50 |
| | | | 345/426 |
| 2015/0325047 A1* | 11/2015 | Conner | G06T 19/006 |
| | | | 345/633 |
| 2015/0350378 A1* | 12/2015 | Hertel | G06F 16/583 |
| | | | 709/203 |
| 2016/0055675 A1 | 2/2016 | Kasahara | |
| 2016/0133230 A1* | 5/2016 | Daniels | G06F 3/147 |
| | | | 345/633 |
| 2016/0140868 A1* | 5/2016 | Lovett | G06T 19/006 |
| | | | 434/118 |
| 2016/0247324 A1* | 8/2016 | Mullins | G02B 27/0179 |
| 2016/0292925 A1* | 10/2016 | Montgomerie | H04W 4/18 |
| 2016/0358383 A1* | 12/2016 | Gauglitz | G06F 3/0304 |
| 2016/0378861 A1* | 12/2016 | Eledath | G06T 19/006 |
| | | | 707/766 |
| 2017/0046877 A1* | 2/2017 | Hustad | G06F 3/011 |
| 2017/0205980 A1* | 7/2017 | Rainisto | G06F 3/0484 |
| 2017/0243403 A1* | 8/2017 | Daniels | G06F 3/1454 |
| 2017/0249745 A1* | 8/2017 | Fiala | G06T 7/13 |
| 2017/0280188 A1* | 9/2017 | Mullins | H04N 21/4302 |
| 2018/0082414 A1* | 3/2018 | Rozenberg | G06T 7/001 |
| 2018/0218538 A1* | 8/2018 | Short | G02B 27/017 |
| 2018/0249144 A1* | 8/2018 | Feng | G06T 7/246 |
| 2018/0300952 A1* | 10/2018 | Evans | G06F 9/453 |
| 2018/0303558 A1* | 10/2018 | Thomas | G06T 19/006 |
| 2018/0324229 A1* | 11/2018 | Ross | H04L 65/4015 |
| 2019/0036726 A1* | 1/2019 | Irving, Jr. | G06F 3/011 |
| 2019/0124391 A1* | 4/2019 | Mullins | H04N 21/4223 |
| 2019/0130219 A1* | 5/2019 | Shreve | G06V 20/64 |
| 2019/0172266 A1* | 6/2019 | Short | G06F 3/04815 |
| 2019/0370544 A1* | 12/2019 | Wright, Jr. | G02B 27/0101 |
| 2020/0160601 A1* | 5/2020 | Shreve | G06F 30/00 |
| 2020/0210967 A1* | 7/2020 | Price | G06Q 10/20 |
| 2020/0342228 A1* | 10/2020 | Prevrhal | G06V 20/20 |
| 2020/0394012 A1* | 12/2020 | Wright, Jr. | G06F 3/011 |
| 2021/0019948 A1* | 1/2021 | Short | G06F 3/04815 |
| 2021/0136226 A1* | 5/2021 | Gigante | H04M 3/5191 |
| 2021/0327303 A1* | 10/2021 | Buras | A61B 8/481 |

FOREIGN PATENT DOCUMENTS

| | | |
|---|---|---|
| JP | 2012108711 A | 6/2012 |
| JP | 2014123193 A | 7/2014 |
| WO | 2008/036050 | 3/2008 |
| WO | 2013094366 A1 | 6/2013 |
| WO | 2015093130 A1 | 6/2015 |

OTHER PUBLICATIONS

Georgel, Is there a Reality in Industrial Augmented Reality, pp. 201-210, IEEE International Symposium on Mixed and Augmented Reality 2011, (Year: 2011).*

Masoni et al., Supporting remote maintenance in industry 4.0 through augmented reality, pp. 1296-1306, 2017 (Year: 2017).*

International Search Report and Written Opinion dated Jan. 7, 2019 for International Application No. PCT/EP2018/078635 Filed Oct. 18, 2018.

Pire, et al: "Stereo Parallel Tracking and Mapping for robot localization", 2015 IEEE/RSJ International Conference on Intelligent Robots and Systems (IROS), Sep. 28-Oct. 2, 2015, Hamburg, Germany.

* cited by examiner

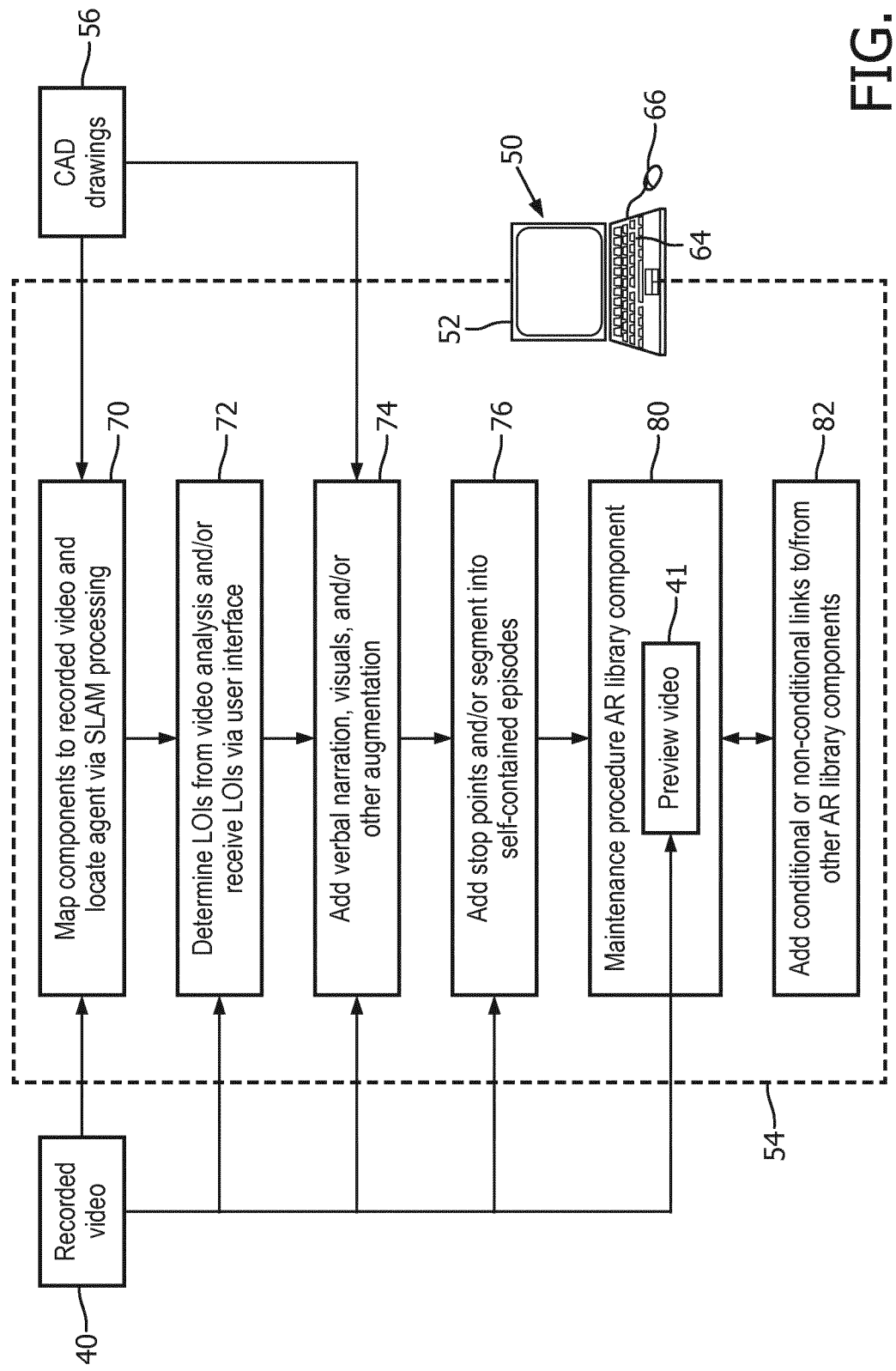

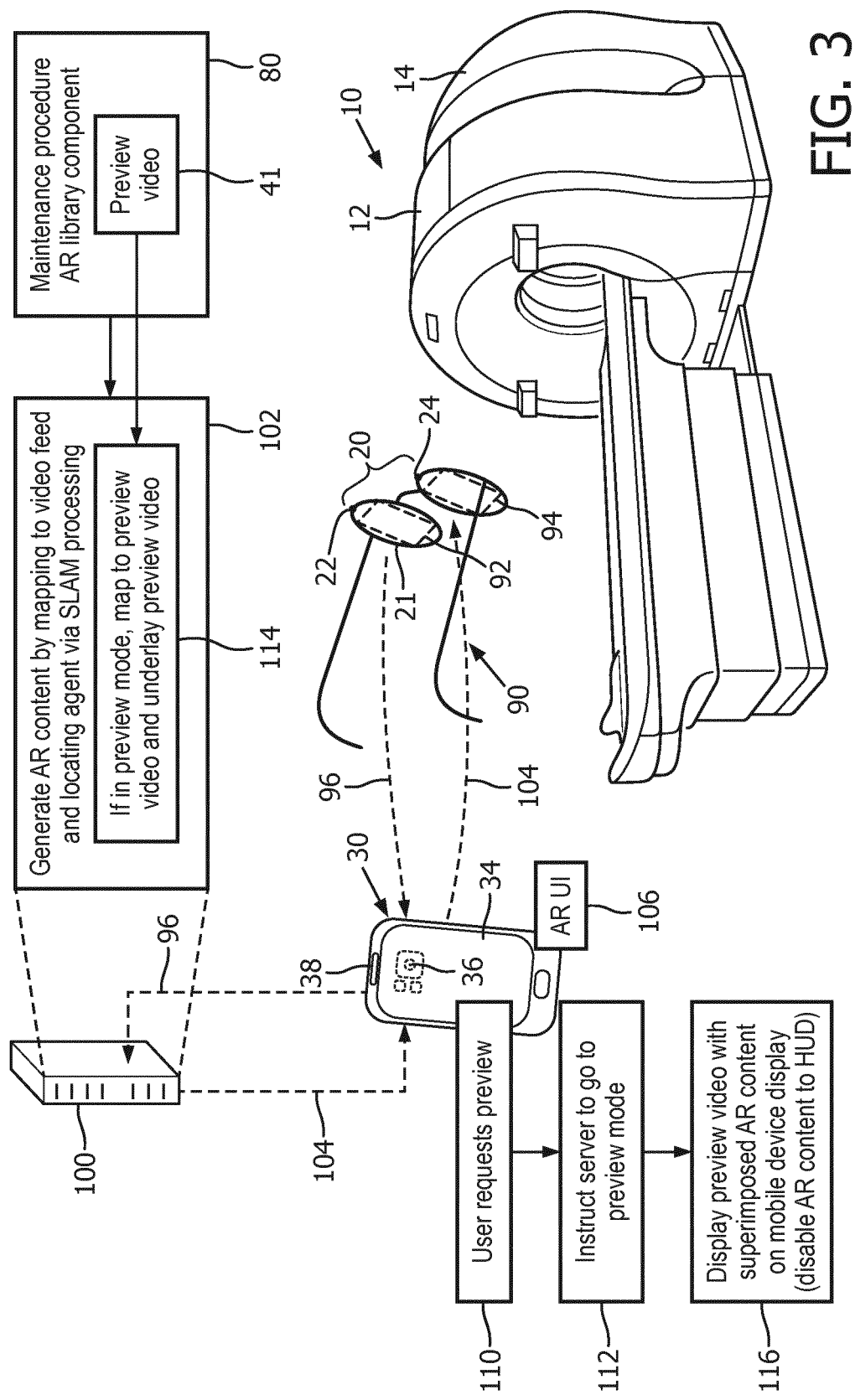

SELF-EXPANDING AUGMENTED REALITY-BASED SERVICE INSTRUCTIONS LIBRARY

CROSS REFERENCE TO RELATED APPLICATIONS

This application is the U.S. National Phase application under 35 U.S.C. § 371 of International Application No. PCT/EP2018/078635 filed Oct. 18, 2018, published as WO 2019/081350 on May 2, 2019, which claims the benefit of U.S. Provisional Patent Application No. 62/575,553 filed Oct. 23, 2017. These applications are hereby incorporated by reference herein.

FIELD

The following relates generally to the field servicing arts and more particularly to the medical imaging device and system servicing arts, to the augmented vision arts, and to related arts.

BACKGROUND

Medical imaging devices include very complex systems such as magnetic resonance imaging (MRI) devices, transmission computed tomography (CT) imaging devices, emission imaging systems such as positron emission tomography (PET) imaging devices and gamma cameras for single photon emission computed tomography (SPECT) imaging, hybrid systems that provide multiple modalities in a single device, e.g. a PET/CT or SPECT/CT imaging device, and imaging devices designed for guiding biopsies or other interventional medical procedures, commonly referred to as image guided therapy (iGT) devices. These are merely illustrative examples.

Modern medical imaging devices and systems present unusual challenges from a maintenance standpoint. They typically include a large number of sub-systems for widely varying purposes, including for example: mechanical and electromechanical systems for loading a patient, transport into the imaging examination area, and subsequent unloading; an x-ray tube assembly and x-ray detector array in the case of a CT imaging device; a rotating gantry assembly again in the case of CT; annular rings of radiation detector modules in the case of a PET imaging device; radiation detector heads and associated robotic hardware for maneuvering the heads around a patient in the case of a gamma camera; a superconducting magnet and associated liquid helium tank and/or other cryostat hardware in the case of MRI; user interfacing components such as computerized controllers, control buttons, switches, touch-sensitive displays, and the like; and so forth. Servicing of medical imaging devices usually must be performed in the field, that is, at the hospital or other medical facility at which the medical imaging device is deployed. Moreover, it is highly desirable to minimize servicing downtime since hospitals and other medical facilities expect these devices to be available nearly continuously to provide imaging or image-guided therapy to patients.

Yet a further difficulty from a servicing standpoint is that medical imaging devices are usually under near-constant development by the manufacturer, and are marketed with various optional components and component packages, so that different deployed installations of the same make/model of medical imaging device may nonetheless have different components depending upon when they were manufactured and depending upon which options the customer chose to purchase.

These considerations make it particularly challenging for service personnel to be fully knowledgeable about every potential maintenance task that may be encountered in the field. Service personnel may consult written service manuals and/or computer aided design (CAD) drawings; however, these may become dated over time, or may fail to include certain optional components. In the case of CAD drawings, service personnel may have difficulty ascertaining the correct drawings (component, version, et cetera) that should be referenced. Furthermore, if the service manual is not written by field service personnel, the manual may fail to address aspects that only become apparent when performing field servicing: for example, a particular component may be difficult to access in the field but this difficulty may not be appreciated by a design engineer drafting the service manual.

Another resource for service personnel in the field may be telephonic or video conferencing access to an expert specializing in the particular component, device, or the like undergoing service. This occupies valuable time of the expert, and requires coordination between the field service person and the expert—either the expert must be "on call" during servicing hours, or a day/time for the call must be scheduled ahead of time. Furthermore, the expert may have limited information on which basis to provide assistance. This information typically includes verbal description of the component and its environment provided by the service person, and perhaps video of the component provided using the built-in camera of a cellular telephone (cellphone) or other mobile device. Important information can be lost in transferring situational data from the service person to the expert and/or in conveying the expert's advice to the service person.

The following discloses a new and improved systems and methods.

SUMMARY

In one disclosed aspect, an augmented reality (AR) based servicing guidance device comprises: a mobile device including a display and a camera; and an electronic processor programmed to perform computer vision (CV) processing to align AR content with a live video feed captured by the camera of the mobile device and to display on the display of the mobile device the AR content aligned with the live video feed.

In another disclosed aspect, an AR based servicing guidance method comprises: using a computer, authoring AR content including the operations of receiving user input at the computer identifying at least one location of interest (LOI) in recorded video of a service call and performing CV processing to align AR content with the recorded video of the service call including aligning a portion of the AR content with the at least one LOI; and using an electronic processor and a mobile device including a display and a camera, presenting the authored AR content including performing CV processing using the electronic processor to align the authored AR content with a live video feed produced by the camera of the mobile device and displaying on the display of the mobile device the authored AR content aligned with the live video feed.

In another disclosed aspect, an AR content authoring device is disclosed for authoring AR content for servicing guidance. The device includes a computer, and a non-transitory storage medium storing instructions readable and executable by the computer to perform an AR content authoring method including: receiving user input at the computer identifying at least one LOI in recorded video of a service call; and performing CV processing to align AR content with the recorded video of the service call including aligning a portion of the AR content with the at least one LOI.

One advantage resides in providing real-time automated assistance for service personnel.

Another advantage resides in providing real-time augmented reality (AR) content to assist in a service call.

Another advantage resides in providing real-time AR content to assist in a service call which is presented from the point-of-view of the service person and is tightly integrated with the service operations to be performed.

Another advantage resides in providing real-time AR content to assist in a service call in combination with the ability to switch to a preview mode incorporating the AR content.

Another advantage resides in providing real-time AR content leveraging a real-time video feed to automatically determine the appropriate AR content.

Another advantage resides in leveraging existing service calls to provide data for authoring AR-based service instructions.

Another advantage resides in leveraging existing service calls to provide data for efficiently authoring updates of existing AR-based service instructions.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 2 diagrammatically illustrates a more detailed embodiment of the AR content authoring device of FIG. 1.

FIG. 3 diagrammatically illustrates an AR-based service instructions delivery device for delivering AR content authored by the AR content authoring device of FIGS. 1 and 2.

DETAILED DESCRIPTION

Figure 1:
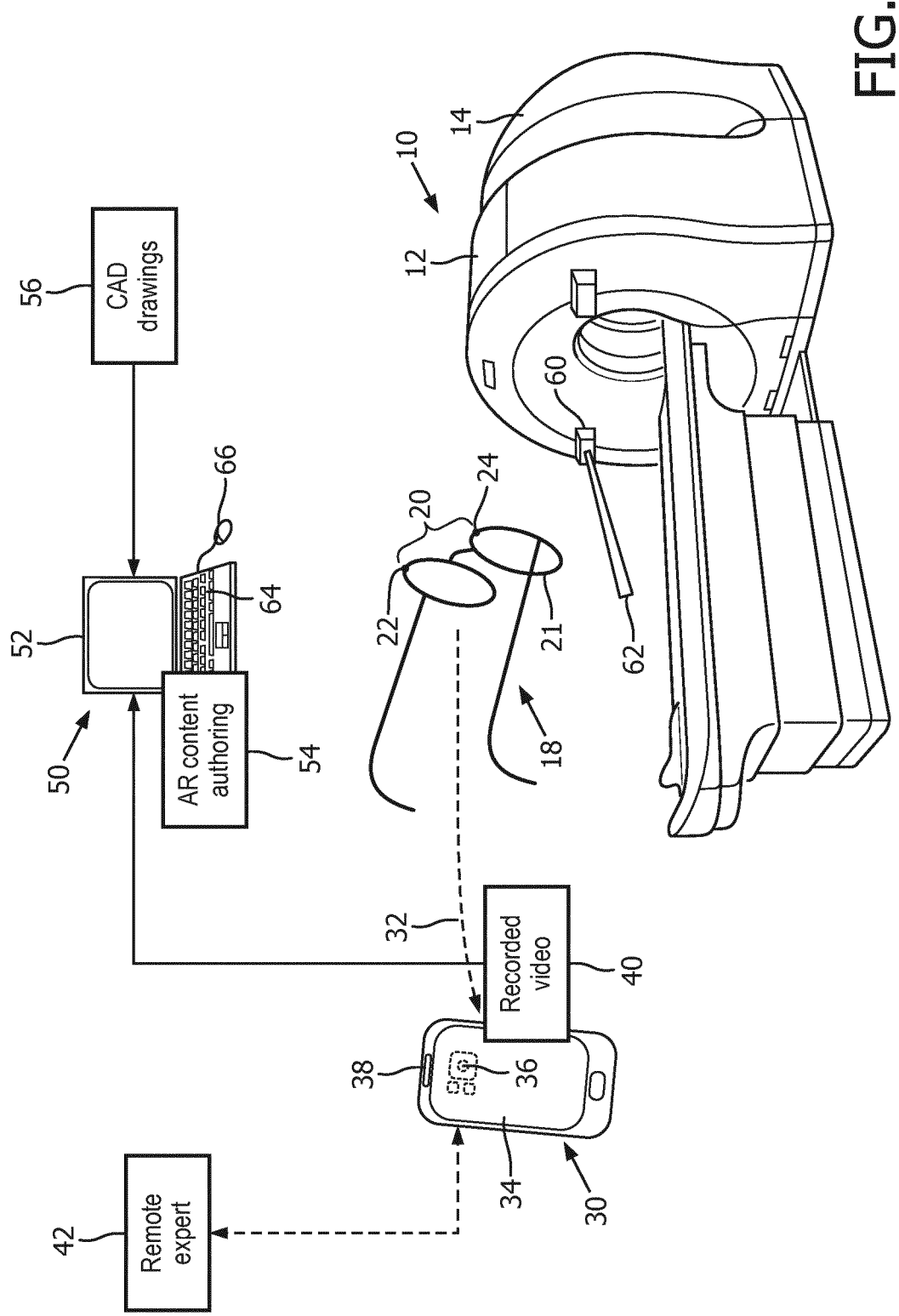
FIG. 1 diagrammatically illustrates embodiments for leveraging a service call to perform maintenance on a medical imaging device in order to provide data for authoring augmented reality (AR)-based service instructions, along with a diagrammatic representation of an AR content authoring device using that data.

In improvements disclosed herein, a video recording (optionally including audio) of a service call for performing maintenance on a medical imaging device is leveraged to provide the basis for authoring augmented reality (AR) content for an AR-based service manual. The service call may be recorded using a regular camera, or to provide depth information a stereo camera may be used, and/or a range camera. If a single (non-range) camera is used then depth information may be extracted from different vantage points as the technician moves around. The camera may be head-mounted so as to provide the "first person" view of the service person. During the service call, a pointer may optionally be used to mark locations of interest (LOIs), and/or may provide running verbal commentary for recordation.

An authoring system is used to convert the recorded video of the service call to AR content for supporting future service calls directed to the same or similar maintenance task. The authoring system may use computer vision (CV) technology such as a Simultaneous Location and Mapping (SLAM) algorithm to simultaneously map the location of the service person and the salient environment (e.g. the serviced component and perhaps neighboring components). The extracted map can be used to align the component in the recorded video with computer-aided design (CAD) drawings of the component, and to spatially position the LOIs in three-dimensional space. A human editor then may add verbal explanation overlay (or this may be done using text-to-speech transcription of a written service manual). The human editor may also add overlays showing LOI markers as appropriate, and optionally may add other AR content assistive for the service technician such as part numbers, pop-up windows showing CAD drawing, CAD animations, or other visuals, colorized highlighting of key parts, and/or so forth. To facilitate use in the field, various stop points may be added to the AR content, and/or the AR content may be segmented into episodes that can be played back in different order (i.e. non-linear playback) to allow for handling of service calls in which steps may be performed in different order.

To use the authored AR-based service manual content, the service technician wears a heads-up display (HUD) having a transparent display (i.e. see-through display) which presents the AR overlay on a transparent screen of the HUD so as to be superimposed on the service person's actual view of the component under service. The HUD further includes a camera that captures the technician's view, and applies a SLAM algorithm to align the AR content with this real-time video feed so as to match the AR content overlay (and audio playback, if provided) with the real-time view of the service person.

Optionally, the service person can select a preview mode in which the pre-recorded video of the service call used to author the AR content is displayed, with the superimposed AR content. In this way, the service person can see a preview of how a step of the maintenance task is performed. Advantageously the AR processing is unchanged in this preview mode, except for: (i) performing the SLAM processing to align the AR content with the preview video rather than the live video feed, and (ii) displaying the prerecorded video content on the transparent display as an underlay.

In a further contemplated variant, the live video feed may be processed to identify a particular component or subcomponent so as to automatically retrieve and present the appropriate AR content.

In the illustrative embodiments, the HUD employs a see-through display, which advantageously is transparent except for the AR content overlay so as to enable the service person to directly observe the component in real time. In a variant embodiment, the HUD employs an opaque display on which the live video feed is displayed as an underlay of the AR content (known as video augmented reality)—in this variant the service person indirectly "sees" the component being serviced by virtue of viewing the real-time video feed display.

As another contemplated variant, instead of a HUD, the AR content could be displayed on the display screen of a cellphone or other mobile device, leveraging the built-in camera provided with most cellphones and other mobile devices to generate the real-time video feed. In this case the device operates in video augmented reality by displaying the live video feed on the cellphone display as an underlay.

The disclosed approaches can also be used for updating an AR-based service manual. For example, if the service person encounters an unexpected problem, say due to use of a substitute part in the component of the particular deployed medical imaging device being serviced, then the live feed provided by the camera of the HUD may be used in conjunction with the authoring system to produce updated AR content appropriate for this substitute part.

With reference to FIG. 1, a system for recording a service call is illustrated. The subject of the illustrative service call is an imaging device 10, which in this illustrative example is a hybrid imaging device including a transmission computed tomography (CT) imaging gantry 12 and a positron emission tomography (PET) imaging gantry 14, that is, the illustrative imaging device is a CT/PET imaging device 10. More generally, the subject of the service call could be any type of imaging device, e.g. a standalone PET or standalone CT imaging device, a magnetic resonance imaging (MRI) device, a gamma camera for single photon emission computed tomography (SPECT) imaging, an image guided therapy (iGT) device, or so forth. Even more generally, the disclosed AR based servicing guidance devices and methods may be applied to any type of system or device servicing performed in the field, e.g. may be applied to a radiation therapy delivery device, a research device such as a magnet, a cryogenic system, a factory robotic system, a processing furnace, or so forth. The service call is recorded using a mobile camera 18 capable of recording video, and preferably having a convenient form factor. In the illustrative example, the mobile camera 18 includes a stereo camera 20 mounted on eyeglasses 21. The stereo camera 20 includes a left-eye camera 22 and a right-eye camera 24, and thus advantageously acquires stereo video so as to simulate binocular human vision. By mounting the stereo camera 20 on the eyeglasses 21, the mobile camera 18 provides a "first person"—if the eyeglasses 21 are worn by a service person who performs (or participates in performing) the servicing then the recorded video of the service call is advantageously from the viewpoint or vantage point of the service person. Instead of the illustrative mobile camera 18 employing eyeglasses 21 as the structural support, another eyewear form factor could be used, e.g. goggles, or a camera mounted on a headband or helmet or the like could provide a similar vantage for recording the video of the service call. By using the stereo camera 20 the recorded video is advantageously binocular in nature and can provide depth information for extracting three-dimensional (3D) information. However, in an alternative embodiment a monocular camera is employed—in this case computer vision can generally extract 3D information based on different vantage points provided by way of natural movement of the camera (due to movement of the service person's head during servicing). As another contemplated variant, a conventional optical camera may be augmented by a range camera to provide depth information.

A difficulty with the mobile camera 18 with the illustrative eyewear-mounted camera 20 is that it may provide limited support structure for mounting an electronic processor—that is, it may be difficult to integrate onto the eyeglasses 21 a microprocessor or microcontroller with sufficient processing capacity to handle the video generation and optional processing. This is addressed in the illustrative embodiment by having the mobile camera 18 in wireless communication with a mobile device 30, such as an illustrative cellular telephone (cellphone, sometimes referred to as a smartphone when equipped to execute application programs or "apps") or a tablet computer. The wireless connection 32 may, by way of non-limiting illustration, be a Bluetooth™ wireless connection, WiFi connection, or other short- or intermediate-range wireless connection. A wired connection is also contemplated, e.g. a USB cable may physically connect the mobile camera 18 with the mobile device 30. The illustrative mobile device 30 includes typical components such as an opaque display 34 disposed on a front side of the mobile device 30, and a rear-facing camera 36 (occluded from view in FIG. 1 and hence illustrated in phantom) arranged on an opposite backside of the mobile device 30. As is typical for such mobile devices, the display 34 is preferably a touch-sensitive display, e.g. a capacitive touch-sensitive display, or a surface-acoustic wave (SAW) display, so that a user can interact by touch with the mobile device 30 to run application programs ("apps"), provide inputs, operate a "soft" keyboard, and/or so forth.

Recorded video 40 is transmitted via the wireless connection 32 from the eyewear-based mobile camera 18 to the mobile device 30. The mobile device 30 typically also includes a microphone 38, which may be used to provide an audio component for the recorded video 40, or alternatively a microphone may be mounted on the eyeglasses 21 (not shown); as another alternative, the recorded video 40 may have no recorded sound (video-only). During the recording of the service call, the mobile device 30 may optionally be performing other tasks, e.g. by running other apps. For example, the mobile device 30 in the form of a cellphone may be used to telephonically discuss the service call with a remote expert 42 (e.g. a human expert with specialized knowledge about the particular service being performed, and/or about the particular device 10 or component of that device undergoing service).

As will be described next, the recorded video 40 provides the basis for authoring augmented vision (AR) content for use during a subsequent service call. To this end, as diagrammatically shown in FIG. 1 the recorded video 40 is transferred to an AR content authoring device 50 in the form of a computer 52 executing instructions read from a non-transitory storage medium (not shown—such as a hard disk drive, RAID, or other magnetic storage medium; a flash memory, solid state drive, or other electronic storage medium; an optical disk or other optical storage medium; various combinations thereof; or so forth) to perform an AR content authoring method 54. The AR content authoring may, for example, entail spatially registering computer aided design (CAD) drawings 56 with the recorded video 40 using computer vision (CV) processing such as Simultaneous Location and Mapping (SLAM) processing to align the AR content (e.g. part number annotations taken from the CAD drawings 56, picture-in-picture (PIP) windows showing CAD drawings or portions thereof or animations generated from the CAD drawings 56, and/or so forth) with the recorded video 40.

It is to be appreciated that FIG. 1 merely shows one illustrative arrangement for capturing the video 40 of the service call. As already mentioned, other types of eyewear or headwear (e.g. goggles, headband, helmet, et cetera) may serve as the support structure for the mobile camera 18 so as to provide a first-person view of the servicing process; additionally, as already mentioned the stereo camera 20 may be replaced by a camera of another type, e.g. a monocular camera, a camera-plus-range camera combination, and/or so forth. In other embodiments, the recorded video of the service call may not be from the first-person view of the service person. For example, in an alternative embodiment, the mobile camera comprises the mobile device 30 with its rear-facing camera 36 arranged on the backside of the mobile device 30 serving as the camera for recording the service call. In this case, the vantage will not be first-person, but the service person (or an assistant) can hold the mobile device 30 so as to direct the rear-facing camera 36 appropriately to record the entire service process or only portions of the service process of interest (e.g. difficult portions).

To assist in authoring the AR content, in some embodiments the service person performing the servicing captured by the recorded video 40 of the service call may actively point to a location of interest (LOI) 60 using a pointer 62 or other distinctive pointing mechanism (which could in some examples merely be the service person's finger or hand). In other embodiments, the LOIs are labeled after the recording of the recorded video 40, e.g. by a user operating one or more user input devices (e.g. an illustrative keyboard 64 and/or mouse 66) of the computer 52 to mark the LOIs in frames of the recorded video 40.

With reference now to FIG. 2, an illustrative embodiment of the AR content authoring device 50 implemented by the computer 52 executing instructions read from a non-transitory storage medium (not shown) is described. The AR authoring process 54 receives as input the recorded video 40 and information from which AR content is to be generated, such as the CAD drawings 56 (which may optionally include data such as part numbers of components, 3D renderings, animations, and/or so forth). In an operation 70, various components of the imaging device 10 (see FIG. 1; more generally, various components of the system or device undergoing servicing) are mapped to the recorded video 40 using computer vision (CV) processing. In a preferred embodiment, the mapping operation 70 is performed using Simultaneous Location and Mapping (SLAM) processing which employs Bayesian inference or another machine learning technique to optimally map the location of the service person (assuming first-person video; or, the location of the mobile device 30 if the recorded video 40 is acquired by the mobile device 30) and reference points on the component or device 10, on the one hand, to the content of a sequence of observations provided by successive frames of the recorded video 40. Optionally, a priori known information such as the spatial layout of the component reference points provided by the CAD drawings 56 may be used to improve the mapping 70. The SLAM processing task may be formulated mathematically by the probabilistic formulation $P(c_1(t), c_2(t), \ldots, c_n(t), p(t)|f_1, \ldots, f_t)$ where $c_1(t), c_2(t), \ldots, c_n(t)$ are the locations of the reference points of the component or device 10 at a time t (where without loss of generality n reference points are assumed), p(t) is the location of the service person at time t, and $f_1, \ldots, f_t$ are the frames of the recorded video 40 up to the time t. Various SLAM algorithms known for robotic vision mapping, self-driving vehicle navigation technology, or so forth are suitably applied to implement the mapping operation 70. In an operation 72, the LOIs are received from a user via the user interfacing device(s) 64, 66 (e.g., by displaying a video frame from the recorded video 40 and providing for the user to click on an LOI using the mouse 66) or are extracted automatically from the recorded video 40 during the SLAM processing 70. This latter approach entails performing SLAM or other CV processing by the computer 52 to detect a user operation (e.g. pointing using the pointer 62, see FIG. 1) captured by the recorded video 40 which indicates at least one LOI (e.g. illustrative LOI 60 indicated in FIG. 1) in the recorded video 40. This indicated LOI 60 then becomes one of the reference points ($c_{LOI}(t)$) to be mapped in the SLAM processing 70.

In an operation 74, AR content is aligned with the recorded video 40 using the results of the SLAM processing 70 and LOI designations 72. For example, an annotation such as a part number annotation, a CAD drawing or CAD drawing portion shown as a PIP window, or a CAD animation shown as a PIP window, may be added at the LOI or closely proximate to the LOI, so as to "label" the LOI with the part number of CAD information. In a more advanced approach, a wire frame drawing of a key part or part combination or assembly may be extracted from the CAD drawings 56 and overlaid as the AR content, again aligned using the mapping output by the SLAM processing 70 and LOI designations 72 with the actual image of the part(s) shown in the recorded video 40. The thusly authored AR content may optionally be color-coded (e.g. using different colors to distinguish different parts of a parts assembly) or otherwise highlighted. AR content in the form of verbal narration may also be added. In this case, the AR content is assumed to have a temporal sequence aligning with the time sequence of frames making up the recorded video 40, and the narration is added to be synced in time with when various servicing tasks are performed in the video. In an optional operation 76, the AR content may be segmented in time by adding stop points and/or segmenting the AR content into self-contained episodes. For example, if the servicing involves removing a first assembly from the device 10 in order to reveal a second assembly that requires servicing, then the removal of the first assembly may be one episode, while the servicing of the revealed second assembly may be a separate and distinct episode. Stop points may be added to allow for stopping the AR content time progression to allow for manual operations—for example, if a part needs to be oiled before installing it may make sense to add a stop point during the oiling process.

The resulting authored AR content forms a maintenance procedure AR library component 80. In some embodiments, as will be described later herein, the AR library component 80 may include or have access to the recorded video 40 which is stored (optionally after segmentation and/or adding stop points analogously to the AR content authoring operation 76) as preview video 41 as diagrammatically indicated in FIG. 2. This preview video 41, if provided, is used to provide a preview of a servicing procedure including superimposed AR content upon request by the service person.

As part of an overall AR maintenance procedure library, the AR library component 80 may optionally be variously linked in an operation 82 with other AR library components to provide AR support for a sensible sequence of servicing operations. For example, consider a process of replacing the x-ray tube of the CT gantry 12 of FIG. 1. This servicing entails opening the CT gantry 12 to access the x-ray tube, removing the x-ray tube, perhaps performing some setup or configuration of the new x-ray tube, installing the new x-ray tube, and then re-assembling the CT gantry 12. Each of these steps may, in one approach, be supported by a separate AR library component which are then suitably linked together. Thus, the service person may initial load and view the CT gantry opening AR content library component—when this is completed the next library component (e.g. configuring the new x-ray tube) may be automatically linked and invoked, and so forth. In a variant embodiment, the linking operation 82 may be automated on the basis of video content, e.g. during playback of the AR content the live video feed (see discussion later herein referencing FIG. 3) the live video feed may be analyzed using CV processing to detect the particular model, type, or other specific component under servicing, and may then call up the correct AR library component for that particular model, type, or other specific component.

With reference to FIG. 3, the AR library component 80 generated by the AR content authoring described with reference to FIG. 2 is suitably presented to a service person performing a subsequent service call (that is, a service call performed subsequently to the service call that was recorded to generate the recorded video 40 as described with reference to FIG. 1). The AR content is presented using a suitable mobile device, such as an illustrative head-up display (HUD) 90 in the form of eyeglasses 21 with the stereo camera 20 mounted thereon. The HUD 90 is thus seen to be similar to the eyewear-based mobile camera 18 already described with reference to FIG. 1; however, the HUD 90 further includes a transparent display, in the illustrative case comprising a left transparent display 92 mounted in the left eye frame of the eyeglasses 21, and a right transparent display 94 mounted in the left eye frame of the eyeglasses 21. The HUD 90 thus constitutes a see-through AR display in which the user (e.g. service person) sees the actual scene directly by viewing through the transparent display 92, 94 while AR content may be superimposed on this actually viewed scene by displaying the AR content on the transparent display 92, 94. The illustrative eyeglasses-based HUD 90 is an example, and numerous other HUD designs are contemplated. In a variant embodiment, the HUD employs goggles with a single lens extending across both left and right eyes—in this embodiment the transparent display may be a single transparent display likewise extending across both left and right eyes.

A see-through AR display has substantial advantages in that the service person directly sees the actual scene (e.g. actually sees the component being serviced) so as to have the maximal visual acuity provided by the person's vision. (If the service person is nearsighted or otherwise requires prescription eyeglasses or contacts, then the service person suitably either wears the prescription contacts in conjunction with using the HUD 90, or optionally may have the glass forming the transparent display 92, 94 modified to incorporate the ocular prescription). However, it is contemplated in an alternative embodiment to employ a video AR display. In this alternative embodiment, the transparent display 92, 94 is replaced by an opaque display which displays a video feed of the actual scene captured by the stereo camera 20. The displayed video feed then serves as an underlay of the displayed AR content. This approach using a video AR display has the disadvantage that generally the video display will be of coarser resolution and/or may have other optical degradation compared with the direct view of the actual scene provided by the illustrative see-through HUD 90.

To provide AR content for supporting the service procedure, a live video feed 96 is communicated to the mobile device 30 (e.g. cellphone or tablet computer) via Bluetooth™ or another short- to intermediate-range wireless communication protocol (or, alternatively, view a wired USB or other wired connection) and the mobile device 30 in turn relays the live video feed 96 to a server computer 100, e.g. via a cellular communication protocol such as 4G, or via a WiFi link to an Internet Service Provider (ISP) and/or hospital electronic network, or so forth. The server computer 100 executes instructions stored on a non-transitory storage medium (not shown—such as a hard disk drive, RAID, or other magnetic storage medium; a flash memory, solid state drive, or other electronic storage medium; an optical disk or other optical storage medium; various combinations thereof; or so forth) to perform alignment 102 to map AR content of the AR library component 80 to the live video feed 96 and to locate the agent (in this embodiment the HUD 90). The alignment 102 may be performed by SLAM processing analogously to the mapping 70 (see FIG. 2) previously described. The AR content that is mapped to the live video feed 96 suitably includes the AR content defined in the AR library component 80, e.g. part number annotations, annotated picture-in-picture (PIP) windows displaying CAD drawings or portions thereof and/or CAD animations, accompanying verbal narration, and/or so forth. For example, the aligned AR content may include a marker aligned with a LOI identified in the live video feed 96 by the SLAM processing. As another example, the aligned AR content may include an annotation (such as a part number annotation, a CAD drawing or CAD drawing portion, or a CAD animation) aligned with a LOI identified in the live video 96 feed by the CV processing 102.

The resulting AR content 104 is transmitted to the mobile device 30 via the 4G, WiFi/ISP/Internet or other communication pathway, and in turn is transmitted from the mobile device 30 to the HUD 90 via the Bluetooth™ or other short- to intermediate-range wireless communication. At the HUD 90, the AR content 104 is displayed on the transparent display 92, 94 as opaque or translucent text and/or images which the service person visually perceives as being superimposed on the view of the actual scene seen by the service person when looking through the transparent display 92, 94. (In the alternative embodiment in which a video AR display is employed, the live video feed 96 is displayed as an underlay over which the AR content 104 is superimposed).

The HUD 90 optionally includes a user interface for controlling. In one illustrative embodiment, this is implemented by way of an AR user interface (UI) application program ("AR UI app") 106 that may be run on the mobile device 30. Via the AR UI app 106, the service person can perform various control operations, such as: turn the AR content on or off (the latter being useful, for example, if the service person is confident that he or she does not need the assistance of the AR content, and/or if the AR content is occluding the view of the component being serviced); selecting to execute a particular AR content episode; pause the AR content (which, again, is generally presented as a time sequence synced with the live video feed 96); adjust the brightness, transparency, and/or other display characteristics of the AR content; turn audio narration on or off; and/or so forth. In some embodiments, the AR UI app 106 may provide one or more mechanisms for the service person to interact with the AR content—for example, if the HUD 90 includes gaze tracking technology then a suitable control mechanism may be to direct gaze at an AR content element (e.g. PIP window, part number annotation, or so forth) and then speak a command which is detected by the microphone 38 and processed by speech recognition to interpret the spoken command. Rather than via spoken command, the user command may instead be input via soft controls (buttons, switches, soft keyboard, et cetera) displayed on the touch-sensitive display 34 of the mobile device 30. These are merely illustrative user interfacing capabilities and control input mechanisms; more generally, substantially any type of user interfacing capability and/or control input mechanism suitably used for controlling presentation of AR content may be employed.

With continuing reference to FIG. 3, in some embodiments a servicing preview may be provided. As already noted, the preview video 41 may be provided for this purpose, which comprises the recorded video 40 used as the basis for authoring the AR content 80 (as previously described with reference to FIG. 2) with some optional processing (e.g. insertion of stop points and/or segmentation into episodes, cf. operation 76 of FIG. 2). To employ the preview mode, the user request preview in an operation 110, e.g. using the AR UI app 106. In a responsive operation 112, the server computer 100 is instructed to switch to preview mode (e.g., command sent along the same 4G or other communication pathway used to convey the live video feed 96 to the server 100; optionally when switching to preview mode this communication of the live video feed to the server is turned off). The command 112 causes the server to perform a modification 114 to the AR alignment process 102. This modification includes substituting the preview video 41 for the live video feed 96, so that the AR content is aligned with the preview video 41, and adding the preview video 41 as an underlay of the AR content. This combination of the AR content aligned to the preview video together with the underlay preview video then becomes the AR content 104 that is transmitted back to the mobile device 30. At the mobile device 30, in an operation 116 the preview video with superimposed AR content is displayed on the display 34 of the mobile device (while, at the same time, the AR content feed to the HUD 90 is turned off). The service person can then view the preview on the display 34 of the mobile device 30 without being hindered by extraneous AR content showing on the transparent display 92, 94. Display of the preview on the display 34 of the mobile device 30 is generally preferable since this content is no longer being spatially aligned with the live video feed from the stereo camera 20; however, in another embodiment it is contemplated to display the preview on the transparent display 92, 94.

The illustrative embodiment of FIG. 3 employs the server computer 100 to perform the computationally complex SLAM processing 102, which is beneficial if the mobile device 30 and the HUD 90 have limited processing capability. Likewise, using the mobile device 30 running the AR UI app 106 to provide user interfacing leverages the touch-sensitive display 34 and optionally other features (e.g. microphone 38) of the mobile device to provide user-friendly interfacing. In alternative embodiments, these operations/processing may be otherwise distributed. In one contemplated embodiment, all processing and user interfacing is integrated with the HUD, which in this contemplated embodiment includes a flash memory or the like to store the AR library component 80 (or downloads this content from a cloud server) so as to provide a single-unit AR based servicing guidance device. As another variant, the operation 102 may be performed at the mobile device 30, using the AR library component 80 either downloaded in its entirety to the mobile device 30 or streamed from a cloud server. These again are merely illustrative variants.

Moreover, the illustrative HUD 90 may be replaced by another mobile device presenting the AR content. For example, the mobile device 30, e.g. cellphone or tablet computer, may serve to present the AR content (in this variant embodiment the HUD 90 is omitted). To use the mobile device 30 to present AR content supporting a service call, the service person points the rear-facing camera 36 at the component being serviced, and the live video feed 96 is recorded by the rear-facing camera 36. The server computer processes the live video feed via operation 102 as already described to generate the AR content, and transmits it back to the mobile device 30 which displays the live video feed 96 with the AR content superimposed (or, alternatively, the superimposition of the AR content on the live video feed 96 is performed at the server computer 100 which then transmits back the AR content with the underlay live video feed combined). Advantageously, the service person can view the display 34 of the mobile device 30 with the rear-facing camera 36 pointed at the component being serviced, so that the mobile device 30 operates as a video AR display.

With comparative reference to FIGS. 1 and 3, it will be appreciated that in some embodiments the HUD 90 used in the AR content support could also be used as the mobile camera 18 for recording the recorded video 40 of FIG. 1, that is, the HUD 90 could be substituted for the mobile camera 18 of FIG. 1. Such interoperability has a valuable advantage: The live video feed 96 captured by the HUD 90 during a service call can optionally be used as the recorded video 40 of FIG. 1, to serve as a basis for performing further AR authoring as per FIG. 2 to generate updated or additional AR content. For example, in the previous example of replacing an x-ray tube of the CT gantry 12, suppose the service person, using the HUD 90 to provide AR content, has a new model x-ray tube that is different from the model that was installed in the service call that was recorded to create the AR content. In this case, the service person can record the live video feed 96 as he or she installs the new-model x-ray tube. This may involve obtaining telephonic advice from a remote expert 42 as previously described with reference to FIG. 1. The recorded live video feed 96 of the installation of the new-model x-ray tube then becomes the recorded video 40 serving as the basis for performing the AR content authoring of FIG. 2. Thereafter, when the new-model x-ray tube is installed in subsequent service calls the newly authored AR content appropriate for the new-model x-ray tube can be used to provide the AR-based guidance. In performing the update AR content authoring as per FIG. 2, in the operation 82 a link can be added that, for a given subsequent service call, loads either the AR content for supporting installation of the old-model tube or the AR content supporting installation of the new-model tube, depending upon which model x-ray tube is being installed. This link may be manual (e.g. the user inputs the x-ray tube model number via the AR UI 106 to load the correct AR support content) or automated (e.g., when the service person first gazes upon the x-ray tube the model number or a model-distinguishing feature is detected via CV processing and used to link in the correct AR content for the x-ray tube being installed.

In the illustrative embodiments, the AR content authoring method 54 of FIG. 2 processes recorded video 40 of a service call performed to repair or maintain a medical imaging device in order to generate the AR content 80 for subsequent use in delivery of AR-based service instructions as described with reference to FIG. 3. However, the AR content authoring method 54 of FIG. 2 may additionally or alternatively be applied to process recorded video 40 for other purposes, such as to create an annotated AR log entry to reflect the maintenance or repair action performed on the imaging device 10. The authored AR content can be used as a record of maintenance checks, so as to verify maintenance and provide a tool for correlating the requirements of planned maintenance.

In maintenance or repair logging applications, the AR content log entry typically comprises the recorded video 40 together with AR content annotations created in the operations 72, 74, and the AR content log entry (including the recorded video 40 and AR annotations) is suitably stored in the electronic service log of the imaging device 10. The LOI designations operations 72 may be performed by the service person immediately after completion of the service call to identify locations he or she serviced, and the operation 74 may entail the service person adding AR content such as part number annotation, verbal and/or textual (optionally speech-to-text) verbal and/or textual explanation of the service performed and/or any unusual aspects of that service, inspection observations made by the service person serving as augmentation to the recorded video of the inspected components, and/or so forth. In these embodiments, the user operations 72, 74 may, for example, be performed on a tablet computer, cellphone, or other portable electronic device carried by the service person. Some annotated AR content may be automatically generated, e.g. adding timestamp information, identification of service personnel (alternatively this could be manually added AR content), CV-based automatic identification of components or other objects appearing in the recorded video 40, and/or so forth.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. An augmented reality (AR) based servicing guidance device comprising:
   a mobile device including a display, a processor, and a camera; and
   a computer programmed to perform computer vision (CV) processing to generate AR content by operations including aligning at least a portion of the AR content with at least one location of interest (LOI) identified in a recorded video of the service call by a user input, wherein the CV processing comprises a Simultaneous Location and Mapping (SLAM) algorithm;
   a server computer programmed to perform CV processing to align AR content with a live video feed captured by the camera of the mobile device, wherein the CV processing comprises a SLAM algorithm and wherein the aligned AR content includes a part number annotation, a computer aided design (CAD) drawing or CAD drawing portion, or a CAD animation aligned with a LOI identified in the live video feed by the CV processing; and
   the processor of the mobile device is programmed to transmit the live video feed produced by the camera of the mobile device to the server computer and to receive the AR Content aligned with the live video feed from the sever computer and to display on the display of the mobile device the AR content aligned with the live video feed; and
   the server computer is programmed to perform a servicing preview by performing the CV processing to align the AR content with preview video of how a step of the maintenance task is performed substituted for the live video feed produced by the camera of the mobile device and simultaneously displaying on the display of the mobile device both the AR content aligned with the preview video and the preview video displayed as an underlay of the AR content, the preview video displayed as an underlay of the AR content being a video to show how the maintenance steps are performed edited with the part number annotation, the CAD drawing or CAD drawing portion, or the CAD animation aligned with a LOI identified in the live video feed by the CV processing.

2. The AR based service guidance device of claim 1 wherein the aligned AR content includes a marker aligned with a location of interest (LOI) identified in the live video feed by the CV processing.

3. The AR based service guidance device of claim 1 wherein:
   the mobile device comprises a heads-up display (HUD) in which the display is a transparent display and the camera is arranged to capture the live video feed corresponding to a viewpoint of a user of the HUD looking through the transparent display; and
   the processor is programmed to display on the transparent display of the HUD the AR content aligned with the live video feed without displaying the live video feed on the transparent display.

4. The AR based service guidance device of claim 1 wherein:
   the mobile device comprises a cellular telephone (cellphone) or tablet computer in which the display is an opaque display disposed on a front side of the cellphone or tablet computer and the camera is a rear-facing camera arranged on an opposite backside of the cellphone or tablet computer; and
   the processor is programmed to display on the opaque display of the cellphone or tablet computer both the AR content aligned with the live video feed captured by the rear-facing camera and the live video feed as an underlay of the AR content;
   wherein the mobile device is used to communicate with a remote expert.

5. An augmented reality (AR) based servicing guidance method comprising:
   performing a first service call to service a medical imaging device undergoing service during the first service call, the medical imaging device comprising a transmission computed tomography (CT) imaging gantry, a positron emission tomography (PET) imaging gantry, a magnetic resonance imaging (MRI) device, a gamma camera for single photon emission computed tomography (SPECT) imaging, or a combination thereof;
   during the first service call, recording video of the medical imaging device undergoing service during the first service call;
   using a computer, authoring AR content including the operations of receiving user input at the computer identifying at least one location of interest (LOI) in the recorded video of the medical imaging device undergoing service during the first service call and performing computer vision (CV) processing to align AR content with the recorded video of the medical imaging device undergoing service recorded during the first service call including aligning a portion of the AR content with the at least one LOI;
   performing a subsequent service call to service a medical imaging device undergoing service during the subsequent service call;
   during the subsequent service call, and using (i) a server computer and (ii) a mobile device including a display and a camera, presenting the authored AR content to a service person performing the subsequent service call by operations including:
      acquiring a live video feed of the medical imaging device undergoing service during the subsequent service call using the camera of the mobile device and transmitting the live video feed from the mobile device to the server computer;

using computer vision (CV) processing performed by the server computer, aligning the authored AR content with the live video feed of the medical imaging device undergoing service during the subsequent service call;

transmitting the AR content aligned with the live video feed of the medical imaging device undergoing service during the subsequent service call from the server computer to the mobile device; and displaying on the display of the mobile device the authored AR content aligned with the live video feed of the medical imaging device undergoing service during the subsequent service call; and using the electronic processor and the mobile device, performing a servicing preview by performing the CV processing to align the authored AR content with preview video substituted for the live video feed of the medical imaging device undergoing service during the subsequent service call produced by the camera of the mobile device and simultaneously displaying on the display of the mobile device both the authored AR content aligned with the preview video and the preview video displayed as an underlay of the authored AR content.

6. The AR based service guidance method of claim 5 wherein the portion of the AR content aligned with the at least one LOI includes one or more of a part number annotation, a computer aided design (CAD) drawing annotation, and a CAD animation annotation.

7. The AR based service guidance method of claim 5 wherein the mobile device comprises a heads-up display (HUD) worn by the service person during the subsequent service call in which the display is a transparent display and the camera is arranged to capture the live video feed corresponding to a viewpoint of the service person wearing the HUD looking through the transparent display, and the presenting of the authored AR content includes:

displaying on the transparent display of the HUD the AR content aligned with the live video feed of the medical imaging device undergoing service during the subsequent service call without displaying the live video feed of the medical imaging device undergoing service during the subsequent service call on the transparent display.

8. The AR based service guidance method of claim 5 wherein the mobile device comprises a cellular telephone (cellphone) or tablet computer in which the display is an opaque display disposed on a front side of the cellphone or tablet computer and the camera is a rear-facing camera arranged on an opposite backside of the cellphone or tablet computer, and the presenting of the authored AR content includes:

displaying on the opaque display of the cellphone or tablet computer both (i) the AR content aligned with the live video feed of the medical imaging device undergoing service during the subsequent service call captured by the rear-facing camera and (ii) the live video feed of the medical imaging device undergoing service during the subsequent service call shown as an underlay of the AR content wherein the mobile device is used to communicate with a remote expert.

9. The AR based service guidance method of claim 5 wherein the AR based service guidance method further comprises:

communicating the live video feed of the medical imaging device undergoing service during the subsequent service call from the mobile device to the server computer; and communicating the authored AR content aligned with the live video feed of the medical imaging device undergoing service during the subsequent service call from the server computer to the mobile device.

10. The AR based service guidance method of claim 5 wherein:

the CV processing performed to align the AR content with the recorded video of the medical imaging device undergoing service during the first service call comprises Simultaneous Location and Mapping (SLAM) processing; and the CV processing performed to align the authored AR content with a live video feed of the medical imaging device undergoing service during the subsequent service call produced by the camera of the mobile device comprises SLAM processing.

* * * * *